United States Patent Office 3,542,713
Patented Nov. 24, 1970

3,542,713
FOG RESISTANT FILMS OF VINYL
CHLORIDE POLYMERS
Mario Gillio-Tos, Rho, Milan, and Helmut Kesseler,
Como, Italy, assignors to W. R. Grace & Co., Duncan,
S.C., a corporation of Connecticut
No Drawing. Filed Apr. 26, 1968, Ser. No. 724,599
Claims priority, application Great Britain, May 4, 1967,
20,738/67
Int. Cl. C09k 3/18
U.S. Cl. 260—23
15 Claims

ABSTRACT OF THE DISCLOSURE

A vinyl chloride polymer having good anti-fogging properties can be prepared by incorporating in the polymer before it is formed into a film the combination of two compounds which are: (A) a polyoxyalkylene monoesterified with a fatty acid containing 8 to 24 carbon atoms and (B) a poly-alcohol containing at least 2 free hydroxyl groups and at least 1 hydroxyl group esterified with a fatty acid containing 8 to 24 carbon atoms.

---

This invention relates to fog-resistant films of vinyl chloride polymers.

When water-containing goods are packaged in films and the packages stored, particularly at low temperature, water tends to condense on the inner surface of the film in the form of droplets. This phenomenon, which is known as "fogging," renders the film unsightly and opaque, particularly in cases where the film is transparent.

Films of vinyl chloride polymers, especially those which contain a certain amount of plasticizer, are particularly useful for packaging water-containing goods, e.g. vegetable produce, fruit, meat and flowers. The advantages of these films are low cost, high transparency, good toughness and flexibility even at low temperatures, and good shrinkability in the case of oriented films. On the othre hand the surfaces of these films are high hydrophobic, which means that fogging easily occurs. Often within some minutes after goods have been packaged and the packages stored at low temperatures, sufficient water evaporates from the packaged goods to saturate the air between the film and the goods and water begins to condense in the form of small individual droplets. As time goes on, more water condenses and an overall fogging effect is produced, which intreferes with the visual identification of the contents of the package. To overcome these shortcomings, several approaches have already been proposed, most of them based on the coating of the hydrophobic film with hydrophilic coating formulations. The function of these hydrophilic coatings is mainly to increase the wettability of the surface, so that water does not condense in the form of small droplets but as a uniform layer. The formation of a uniform layer does not impair the transparency of the film and the contents of the package remain easily identifiable.

The disadvantages of the anti-fog coating are:
(1) A separate coating and drying step is required.
(2) Especially during drying, thin PVC films tend to form wrinkles and to become distorted, particularly in the case of oriented films which normally lose some free shrink during drying.
(3) The coating thickness is always irregular due to gauge variations of the PVC films and to other parameters which are difficult to control.
(4) The coating tends to migrate into the film resulting in a decrease of the anti-fog properties with time.

The incorporation of suitable anti-fog agents directly into the polymer used for the manufacture of the film overcomes some of the problems given above. The known anti-fog agents to be incorporated suffer, however, from the following shortcomings:

(a) Poor anti-fog properties, unless they are incorporated in such an amount that they impair all the important properties of the films, e.g. optical properties, sealability and handleability.

(b) Formation of whitish spots when the film is stored at relative humidities above 50%. This effect is normally reversible, which means that the spots disappear when the film is stored at realtive humidity lower than 50%. This, however, is not satisfactory for practical uses as it would require special storage conditions prior to the utilization of the film.

(c) In extruded films the presence of the known anti-fog agents results in excess of lubrication because these products have strong lubricating properties. An excess of lubricants in PVC formulations always results in feeding problems, output irregularities, and poor homogenization of the melt with formation of a structured film impaired by surface irregularities.

It has now been found that the incorporation into the polymer of a specific combination of compounds alleviates the above-mentioned problems. Accordingly the invention provides a film of a vinyl chloride polymer (as hereinafter defined) which comprises (A) a polyoxyalkylene monoesterified with a fatty acid containing 8 to 24 carbon atoms and (B) a poly-alcohol containing at least two free hydroxyl groups and at least one hydroxyl group esterified with a fatty acid containing 8 to 24 carbon atoms.

The novel films of the invention can readily be prepared by incorporating the compounds (A) and (B) into the vinyl chloride polymer before it is formed into a film, e.g. by extrusion, calendering or solution casting. The compounds can be incorporated into the polymer by the methods well known for incorporating additives into vinyl chloride polymers, e.g. by dry blending or by mixing at elevated temperatures in suitable equipment such as an extruder, particularly of the twin screw type, or an internal blender of the Banbury type. After the film has been formed from the blend, when it generally has a thickness of 0.2 to 10 mils, preferably 0.4 to 4 mils, it can if desired be oriented by any of the methods known in the art.

The term "vinyl chloride polymer" is used in this specification to include homopolymers of vinyl chloride, which are preferred, and also copolymers of vinyl chloride with copolymerizable monomers, e.g. vinyl acetate, vinylidene chloride, styrene, acrylonitrile, propylene, dialkyl fumarate or maleate, alkyl acrylates and methacrylates and alkyl vinyl ethers. Also blends of resins, e.g. polyblends of polyvinyl chloride with chlorinated polyethylene, or polyvinyl chloride with ABS terpolymers, and of polyvinyl chloride with acrylate or methacrylate polymers, can be used.

The polymers can contain plasticizers, e.g. esters of alcohols with mono-or dicarboxylic aliphatic and aromatic acids, epoxidized natural oils, polymerics, and other commercial plasticizers. Typical examples include phthalates, adipates, sebacates, azelates, glycolates, ricinoleates, citrates, benzoates, phosphates, succinates and epoxy derivatives.

The amount of plasticizer to be used is related to the film properties which are required for different applications. The most important properties are the modulus, stretchability, low temperature flexibility, and oxygen permeability. For wrapping fresh red meat the deciding properties are extremely high oxygen permeability to maintain the red color of the meat, good mechanical properties at low temperature, because normally the package is stored under refrigerated conditions, and good anti-fog properties to permit continuous visual examination of the quality of the packed meat. In such a case a plasticizer system should be used which prevailingly contains those plasticizers which are known for good low temperature properties and high oxygen transmission rate. Plasticizers of non-branched aliphatic dicarboxylic acids are preferred for this purpose; the amount should preferably be in the range of 15–30 percent. In other cases where the low temperature properties and the oxygen permeability are not of vital importance, i.e. for packaging of produce, cheese, poultry, etc., other plasticizers such as the esters of aromatic dicarboxylic acids or epoxidized natural oils can be safely used. In many cases mixtures of the above-mentioned plasticizers can be used.

The polymers can also contain stabilizers, e.g. the commercially available products such as organo-tin derivatives, which may or may not contain sulphur, calcium-zinc soaps, barium-cadmium derivatives, lead salts and organic stabilizers. Other additives, such as lubricants, flame retardants, dyes, pigments, antioxidants, ultraviolet adsorbers and fillers, may also be present.

When the films according to the invention are to be used for food packaging, the stabilizers and lubricants must be unobjectionable from the toxicological point of view. Non-toxic stabilizers preferably include calcium-zinc soaps and organics. In some cases where the films are to be used for non-food applications, such as packaging of flowers or other moisture omitting items, the toxicological aspect of the ingredients is not important, so that toxic stabilizers and lubricants can be employed if desired.

Compound (A) is preferably an esterified polyoxyethylene having only two hydroxyl groups, particularly one containing 2 to 100 oxyethylene units, but other polyoxyalkylene compounds, e.g., polyoxypropylenes, can be used. The fatty acid used to esterify the polyoxyalkylene can be saturated or unsaturated and can contain hydroxyl groups. The fatty acid can of course be a mixture of acids such as is obtained from natural fats. Specific examples of compounds of type (A) include polyoxyethylene monocaprylate, monococcoate, monolaurate, monostearate, monooleate, monoricinoleate, monopalmitate, monobehenate, mono-12-hydroxystearate, monosoya, monolinoleate, monolinolenate and monomyristate.

The fatty acid used to esterify the polyalcohol to obtain compound (B) can be as described above. Specific examples of compounds of type (B) are monoglycerides of fat forming fatty acids as obtained by the glycerolysis of edible fats, e.g., glycerol monocaprylate, monocaprinate, monocapreate, monolaurate, monococcoate, monopalmitate, monomyristate, monostearate, monobehenate, monooleate, monoricinoleate, monolinoleate, monolinolenate, mono-12-hydroxystearate and monosoya; sorbitol monocaprylate, monocaprinate, monocaproate, monolaurate, monococcoate, monopalmitate, monomyristate, monostearate, monobehenate, monooleate, monoricinoleate, monolinoleate, monolinolenate, mono-12-hydroxystearate and monosoya; pentaerythritol monocaprylate, monocaprinate, monocapreate, monolaurate, monococcoate, monopalmitate, monomyristate, monostearate, monobehenate, monooleate, monoricinoleate, monolinoleate, monolinolenate, mono- 12 - hydroxystearate and monosoya; sorbitan trioleate, tristearate and sesquioleate; and pentaerythritol di-oleate. Naturally it is to be understood that most of the commercial products are mixtures of mono-, di- and tri-glycerides, with a prevailing amount of the mono-glyceride.

The use of the combination of the two components according to the invention is distinctly superior to the use of the components individually. If component (A) is used alone, the film obtained exhibits satisfactory anti-fog properties but suffers from the disadvantage of forming a dramatic amount of whitish spots at relative humidities higher than 50%. Use of component (B) alone, on the other hand, does not result in the formation of whitish spots at high relative humidities, but confers only poor anti-fog properties. The combination of components (A) and (B) has excellent anti-fog properties and is unaffected by relative humidity changes. The formation of whitish spots seems to be related to the HLB number of the anti-fog agents or its mixtures. The term "HLB" as used herein is defined in the Journal of the Society of Cosmetic Chemists of 1954, pp. 249–256. Briefly, the term "HLB" comes from the words hydrophilic-lipophilic balance. The NLB method described in these publications is a method which assigns numerical values to surfactants, thereby providing a system of classification that is related to their behavior and to their solubility in water. The HLB method is based on the premise that all surfactants combine hydrophilic and lipophilic groups in one molecule and the proportion between the weight percentages of these two groups for non-ionic surfactants is an indication of the behaviour that may be expected from the product. The HLB number of mixtures is simply obtained by multiplying the percentages of each component with each individual HLB number and summing up the relative contributions of each component. It has been found that when using a combination of components (A) and (B) as defined above, in order to avoid the formation of whitish spots, but maintaining satisfactory atni-fog properties, the HLB number of the mixture of (A) and (B) is preferably at least 4, particularly at least 5, especially 5 to 10.

Although the HLB number of the mixture of the two compounds (A) and (B) is an important factor in deciding the total amount and relative proportions of the two compounds, other factors need to be considered also, in particular the type and amount of plasticizers present in the polymer and on the final thickness of the film. To have a good and anti-fog efficiency it is apparently necessary that the combination of anti-fog agents migrates into the surface, thus creating a hydrophilic layer which can spread the condensed water droplets. The migration of the anti-fog agents is related to its compatibility with the polymer-plasticizer system; for example, it has been found that in certain cases the same combination of compounds (A) and (B) results in superior anti-fog properties when using as plasticizer an ester of aliphatic dicarboxylic acid (adipates, sebacates, azelates) as compared to the use of ester of aromatic acids (phthalates, benzoates). With regard to the thickness of the film (which is a measure of the surface-volume ratio) it has been found that in general the thinner the film, the more anti-fog agents have to be added to the formulation in order to have the same concentration on the surface. It has been found that the total amount of compounds (A) and (B) required to produce a given effect is in general almost proportional to the surface-volume ratio of the film, i.e. its thickness. For example, for a film having a thickness ranging from 0.50–0.75 mil, compounds (A) and (B) should preferably be added in a total quantity of 2–5%, preferably 3–4%, by weight, whereas for films ranging from 0.75–1.50 mils the total quantity is preferably 1 to 3 percent. In the case of oriented films it has been found that the amount of compounds (A) and (B) has to be slightly increased with respect to the same film without orientation.

Bearing in mind the factors noted above, it has been found that satisfactory results are generally obtained when the total amount of compounds (A) and (B) is 0.5 to 5.0% by weight, based on the weight of the film. The ratio by weight of compound (A) to (B) may range from 1:0.2 to 1:3.

The following examples illustrate the invention.

EXAMPLE 1

A suspension polyvinyl chloride homopolymer having a K value of 70 was compounded with the following ingredients:

|   | Percent |
|---|---|
| Dioctyl adipate | 15.0 |
| Epoxidized soyabean oil | 10.0 |
| Ca-Zn soaps | 1.5 |
| Lubricants | 0.3 |

To this basic formulation varying amounts of polyoxyethylene (400) monococcoate as compound (A) and glycerol monooleate as compound (B) were added. The formulations were blended at 140° C. in a high speed blender and extruded into films 0.50 mil thick. The melt temperature was 180° C. The extrusion equipment used was a one-screw extruder together with an annular crosshead die. Table I below reports the combination of compounds (A) and (B) employed and gives the results of anti-fog properties and appearance of the film.

The anti-fog properties were determined by using a foamed polystyrene tray containing wet sawdust, wrapping the film manually around the tray and sealing the package on a hot plate. The tight package was placed in a refrigerator kept at 4±1° C. The package was visually examined after different periods of time and the appearance after ½ hour was judged. "Excellent" means that the initial film transparency does not deteriorate at all on storage, no droplets being visible, because the water condenses in the form of an invisible uniform layer. "Satisfactory" means that the initial film transparency is only slightly impaired; the contents of the package remain distinctly identifiable and no visible droplets are present. "Very poor" indicates that the film transparency is completely impaired by small individual droplets which render it highly opaque so that the contents of the package can no longer be identified.

The last column of Table I refers to the appearance of the film after having been stored for one week at 80% relative humidity at an average temperature of 20° C. "Excellent" means no formation of whitish spots as in the film not containing anti-fog agents. "Very poor" indicates an abundance of opaque whitish zones on the film.

The results clearly show that excellent fog resistance is imparted to the film. The results also demonstrate that mixtures according to the invention having an HLB lower than 10 result in a completely satisfactory film appearance. The films based on formulations 1 to 7 exhibit practically the same physical properties as formulation 8, which does not contain the anti-fog agents. On the other hand certain properties such as oxygen transmission rate are even enhanced by the addition of the anti-fog agents of the invention. This is a very important fact, especially in the case of fresh red meat packaging. Table I shows also, through the results obtained with formulation 9 and 10, that the combination of polyoxyethylene (400) monococcoate and glycerol monooleate is much more effective than the single components.

EXAMPLE 2

To the same basic formulation as in Example 1 the following combinations of agents have been added: polyoxyethylene (200) monolaurate, as compound (A), and sorbitan monooleate, as compound (B). Table II summarizes the results on films which were obtained in the same way as described in Example 1.

EXAMPLE 3

To the same basic formulation of Example 1 the following agents have been added: polyoxyethylene (1000) monostearate, as compound (A), and glycerol monooleate, as compound (B). Table III summarizes the results on films which have been obtained in the same way as described in Example 1.

EXAMPLE 4

A suspension polyvinyl chloride homopolymer having a K value of 65 was compounded with the following ingredients:

|   | Percent |
|---|---|
| Dioctyl phthalate | 18.0 |
| Epoxidized soya oil | 3.0 |
| Ca-Zn soaps | 2.0 |
| Lubricants | 0.5 |

To this basic formulation varying amounts of polyoxyethylene (400) monococcoate as compound (A) and glycerol monooleate as compound (B) were added. Table IV summarizes the results on films which were obtained in the same way as described in Example 1. All the reported films have been longitudinally oriented on a commercial orientation machine at a stretching ratio of 2.0 to 1.0 at a temperature of 110° C. The results obtained are also reported in Table IV.

EXAMPLE 5

A suspension polyvinyl chloride homopolymer having a K value of 70 was compounded with the following ingredients:

|   | Percent |
|---|---|
| Dioctyl phthalate | 9.0 |
| Dioctyl adipate | 9.0 |
| Epoxidized soya oil | 3.0 |
| Organotin stabilizer | 1.0 |
| Lubricant | 0.4 |

To this basic formulation varying amounts of polyoxyethylene (400) monolaurate as compound (A) and sorbitan trioleate as compound (B) were added. Table V summarizes the results on films which were obtained in the same way as described in Example 1. Some of the reported films have been biaxially oriented at a stretching ratio of 1.9 to 1.0 in both directions at a temperature of 110° C.

TABLE I

| Formulation No.: | Polyoxyethylene (400) monococcoate, percent | Glycerol monooleate, percent | HLB No. | Anti-fog properties after ½ hr. at 4° C. | Appearance at 80% R.H. |
|---|---|---|---|---|---|
| 1 | 3.0 | 1.0 | 11.3 | Satisfactory | Very poor. |
| 2 | 2.0 | 1.0 | 10.3 | do | Do. |
| 3 | 2.0 | 2.0 | 8.6 | do | Satisfactory. |
| 4 | 1.0 | 2.0 | 6.9 | Excellent | Excellent. |
| 5 | 1.0 | 3.0 | 6.0 | do | Do. |
| 6 | 1.0 | 1.0 | 8.6 | Satisfactory | Satisfactory. |
| 7 | 1.5 | 1.5 | 8.6 | do | Do. |
| 8 | 0 | 0 |  | Very poor | Excellent. |
| 9 | 3.0 | 0 | 14.0 | Fair | Very poor. |
| 10 | 0 | 3.0 | 3.2 | Poor | Excellent. |

TABLE II

| Formulation No.: | Polyoxyethylene (200) monolaurate, percent | Sorbitan monooleate, percent | HLB No. | Anti-fog properties after ½ hr. at 4° C. | Appearance |
|---|---|---|---|---|---|
| 8 | 0 | 0 | | Very poor | Excellent. |
| 11 | 3.0 | | 10.5 | Satisfactory | Very poor. |
| 12 | 0 | 3.0 | 4.3 | Poor | Excellent. |
| 13 | 3.0 | 1.0 | 8.9 | Satisfactory | Satisfactory. |
| 14 | 2.0 | 1.0 | 8.4 | do | Do. |
| 15 | 1.0 | 1.0 | 7.4 | do | Excellent. |
| 16 | 1.0 | 2.0 | 6.3 | Excellent | Do. |

TABLE III

| Formulation No.: | Polyoxyethylene (1,000) monostearate, percent | Glycerol monooleate, percent | HLB No. | Anti-fog properties after ½ hr. at 4° C. | Appearance |
|---|---|---|---|---|---|
| 8 | 0 | 0 | | Very poor | Excellent. |
| 17 | 3.0 | | 15.8 | Satisfactory | Very poor. |
| 18 | 0 | 3.0 | 3.2 | Poor | Excellent. |
| 19 | 3.0 | 1.0 | 12.6 | Satisfactory | Very poor. |
| 20 | 2.0 | 1.0 | 11.4 | do | Do. |
| 21 | 1.0 | 1.0 | 9.5 | Excellent | Satisfactory. |
| 22 | 1.0 | 2.0 | 7.3 | do | Excellent. |

TABLE IV

| | Polyoxyethylene (400) monococoate, percent | Glycerol monooleate, percent | HLB No. | Anti-fog properties after ½ hr. at 4° C. | | Appearance | |
|---|---|---|---|---|---|---|---|
| | | | | Nonoriented film | Oriented film | Nonoriented film | Oriented film |
| Formulation No.: | | | | | | | |
| 23 | 0 | 0 | | Very poor | Very poor | Excellent | Excellent. |
| 24 | 3.0 | | 14.0 | Fair | Poor | Very poor | Very poor. |
| 25 | 0 | 3.0 | 3.2 | Poor | do | Excellent | Excellent. |
| 26 | 3.0 | 1.0 | 11.3 | Satisfactory | Fair to satisfactory | Very poor | Very poor. |
| 27 | 2.0 | 1.0 | 10.3 | do | do | Poor | Poor. |
| 28 | 1.0 | 1.0 | 8.6 | do | do | Excellent | Excellent. |
| 29 | 2.0 | 2.0 | 8.6 | do | do | do | Do. |
| 30 | 1.0 | 2.0 | 6.9 | Excellent | Excellent | do | Do. |
| 31 | 1.0 | 3.0 | 5.9 | do | do | do | Do. |

TABLE V

| | Polyoxyethylene (400) monolaurate, percent | Sorbitan trioleate, percent | HLB No. | Anti-fog properties after ½ hr. at 4° C. | | Appearance | |
|---|---|---|---|---|---|---|---|
| | | | | Nonoriented film | Oriented film | Nonoriented film | Oriented film |
| Formulation No.: | | | | | | | |
| 32 | 0 | 0 | | Very poor | | Excellent | |
| 33 | 3.0 | 0 | 12.3 | Satisfactory | | Very poor | |
| 34 | 0 | 3.0 | 1.8 | Very poor | | Excellent | |
| 35 | 3.0 | 1.0 | 10.1 | Satisfactory | Satisfactory | Poor | Poor. |
| 36 | 2.0 | 2.0 | 7.0 | Excellent | Satisfactory to excellent | Satisfactory to excellent | Satisfactory to excellent. |
| 37 | 1.0 | 2.0 | 5.2 | do | do | Excellent | Excellent. |

We claim:

1. A film of a vinyl chloride polymer which comprises:
   (A) a polyoxyethylene, having only two hydroxyl groups, monoesterified with a fatty acid containing 8 to 24 carbon atoms; and
   (B) a partially esterified alcohol containing at least two free hydroxyl groups and at least one ester group derived from a fatty acid containing 8 to 24 carbon atoms.

2. A film according to claim 1 wherein the esterified polyoxyethylene contains 2 to 100 oxyethylene units.

3. A film according to claim 1 wherein the ratio by weight of compound (A) to compound (B) is 1:0.2 to 1:3.

4. A film according to claim 1 wherein the ratio by weight of compound (A) to compound (B) is 1:05 to 1:3.

5. A film according to claim 1 wherein the ratio by weight of compound (A) to compound (B) is 1:1 to 1:3.

6. A film according to claim 1 wherein the ratio by weight of compound (A) to compound (B) is about 1:2.

7. A film according to claim 1 wherein the HLB number of the mixture of (A) and (B) is at least 4.

8. A film according to claim 7 wherein the HLB number is at least 5.

9. A film according to claim 8 wherein the HLB number is 5 to 10.

10. A film according to claim 1 wherein the total amount of (A) and (B) together is 0.5 to 5.0% by weight of the film.

11. A film according to claim 10 which is 0.50 to 0.75 mil thick and contains 2 to 5% by weight of compounds (A) and (B).

12. A film according to claim 11 which contains 3 to 4% by weight of compounds (A) and (B).

13. A film according to claim 10 which is 0.75 to 1.50 mils thick and contains 1 to 3% by weight of compounds (A) and (B).

14. A film according to claim 1 which contains 5 to 40% by weight of a plasticizer for the vinyl chloride.

15. A film according to claim 14 wherein the plasticizer is an ester of an aliphatic dicarboxylic acid.

References Cited
UNITED STATES PATENTS

| | | | |
|---|---|---|---|
| 2,676,943 | 4/1954 | Carson | 260—31.8 |
| 3,425,976 | 2/1969 | Adams et al. | 260—23 |

HOSEA E. TAYLOR, Primary Examiner

D. J. BARRACK, Assistant Examiner

U.S. Cl. X.R.

99—174; 260—23.7, 31.2, 31.8, 41, 45.75, 92.8, 891